United States Patent
Stancu et al.

(10) Patent No.: US 8,875,768 B2
(45) Date of Patent: Nov. 4, 2014

(54) TAPE APPLICATION MACHINE FOR APPLYING AN ELECTRICALLY NON-CONDUCTIVE TAPE TO A BATTERY CELL

(75) Inventors: Janina Stancu, La Salle (CA); Kenneth J. Oswandel, Livonia, MI (US)

(73) Assignee: LG Chem, Ltd., Seoul (KR)

( * ) Notice: Subject to any disclaimer, the term of this patent is extended or adjusted under 35 U.S.C. 154(b) by 841 days.

(21) Appl. No.: 13/077,124

(22) Filed: Mar. 31, 2011

(65) Prior Publication Data

US 2011/0252632 A1    Oct. 20, 2011

Related U.S. Application Data

(60) Provisional application No. 61/325,085, filed on Apr. 16, 2010.

(51) Int. Cl.
| | | |
|---|---|---|
| H01M 2/34 | (2006.01) | |
| B65H 35/00 | (2006.01) | |
| H01M 2/02 | (2006.01) | |
| H01M 10/04 | (2006.01) | |
| H01M 10/058 | (2010.01) | |

(52) U.S. Cl.
CPC .......... *H01M 2/0212* (2013.01); *B65H 35/0013* (2013.01); *B65H 2701/131* (2013.01); *H01M 10/0404* (2013.01); *H01M 10/058* (2013.01); *H01M 2/34* (2013.01); *Y02E 60/12* (2013.01)
USPC ........................................................ 156/475

(58) Field of Classification Search
None
See application file for complete search history.

(56) References Cited

U.S. PATENT DOCUMENTS 2,512,579 A * 6/1950 Long ............................ 156/468

FOREIGN PATENT DOCUMENTS

| CN | 201121069 Y | 9/2008 |
|---|---|---|
| JP | H08222204 A | 8/1996 |
| JP | H11152119 A | 6/1999 |
| JP | H11316116 A | 11/1999 |
| JP | 2000173577 A | 6/2000 |
| JP | 2001058618 A | 3/2001 |
| JP | 2004087422 A | 3/2004 |
| JP | 2008041494 A | 2/2008 |
| KR | 20040056413 A | 7/2004 |
| KR | 20040056414 A | 7/2004 |

OTHER PUBLICATIONS

International Search Report for International Application No. PCT/KR2011/002586 dated Nov. 21, 2011.

(Continued)

*Primary Examiner* — Barbara J Musser
(74) *Attorney, Agent, or Firm* — Buckert Patent & Trademark Law Firm, P.C.; John F. Buckert

(57) ABSTRACT

A tape application machine and method are provided. The machine includes a nest device that moves along a linear rail from a first position to a second position. The nest device holds a battery cell therein. The machine further includes a tape application device that dispenses electrically non-conductive tape and applies a first portion of the tape on a first side of the battery cell. The machine further includes a tape bending device that conforms a second portion of the electrically non-conductive tape onto a second side of the battery cell. The machine further includes a tape compression device that compresses the tape on the first and second sides of the battery cell.

10 Claims, 10 Drawing Sheets

(56) References Cited

OTHER PUBLICATIONS

U.S. Appl. No. 12/889,973, filed Sep. 24, 2010 entitled Ultrasonic Welding Assembly and Method of Attaching an Anvil to a Bracket of the Assembly.

U.S. Appl. No. 12/890,047, filed Sep. 24, 2010 entitled Apparatus for Assembly of a Press-Fit Modular Work Piece.

U.S. Appl. No. 12/897,097, filed Oct. 4, 2010 entitled Press Assembly and Method for Bending Electrical Terminals of Battery Cells.

* cited by examiner

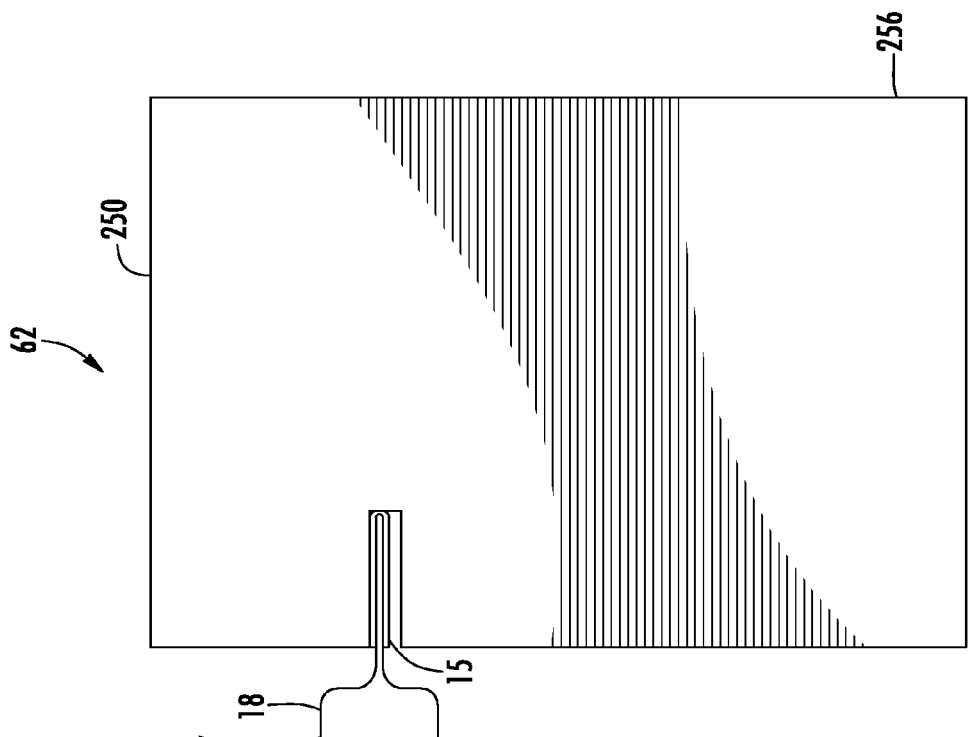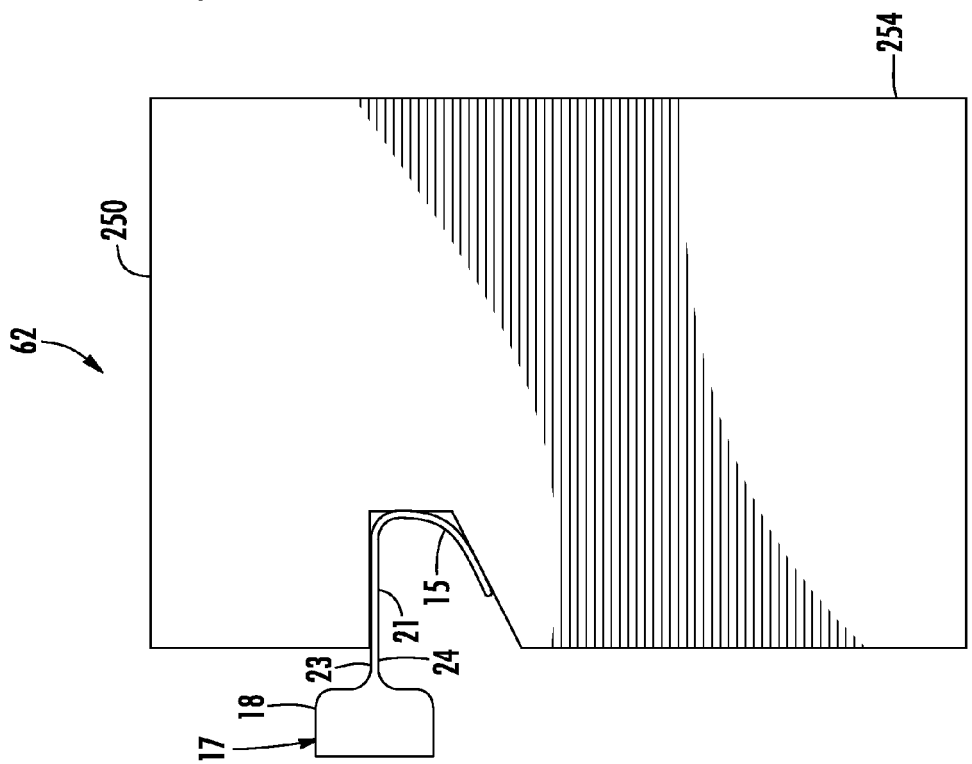

TAPE APPLICATION MACHINE FOR APPLYING AN ELECTRICALLY NON-CONDUCTIVE TAPE TO A BATTERY CELL

CROSS-REFERENCE TO RELATED APPLICATIONS

This application claims priority to U.S. Provisional Patent Application No. 61/325,085 filed on Apr. 16, 2010, the entire contents of which are hereby incorporated by reference herein.

BACKGROUND

Current leaks in a battery pack can create short circuits that may degrade the battery pack. Such leaks may occur if metallic parts come in contact with one or more battery cells of the battery pack. For example, current leaks may occur in a pouch area or an edge portion of a battery cell if metallic parts come in contact with the pouch area or the edge portion.

Accordingly, the inventors herein have recognized that it is desirable to apply an electrically non-conductive tape to a battery cell utilizing a new tape application machine to reduce and/or minimize the foregoing current leaks.

SUMMARY

A tape application machine in accordance with an exemplary embodiment is provided. The tape application machine includes a nest device configured to move along a linear rail from a first position toward a second position. The nest device is further configured to hold a battery cell therein. The tape application machine further includes a tape application device configured to dispense a predetermined length of electrically non-conductive tape and to apply a first portion of the electrically non-conductive tape on a first side of the battery cell when the nest device moves proximate to the tape application device. The tape application machine further includes a tape bending device configured to conform a second portion of the electrically non-conductive tape onto a second side of the battery cell when the nest device moves proximate to the tape bending device. The tape application machine further includes a tape compression device configured to compress the electrically non-conductive tape on the first and second sides of the battery cell when the nest device moves proximate to the tape compression device.

A method for applying an electrically non-conductive tape to a battery cell in accordance with another exemplary embodiment is provided. The method includes moving a nest device holding a battery cell therein along a linear rail from a first position toward a second position. The method further includes dispensing a predetermined length of electrically non-conductive tape and applying a first portion of the electrically non-conductive tape on a first side of the battery cell utilizing a tape application device when the nest device moves proximate to the tape application device. The method further includes conforming a second portion of the electrically non-conductive tape onto a second side of the battery cell utilizing a tape bending device when the nest device moves proximate to the tape bending device. The method further includes compressing the electrically non-conductive tape on the first and second sides utilizing a tape compression device when the nest device moves proximate to the tape compression device.

These and other advantages and features will become more apparent from the following description taken in conjunction with the drawings.

BRIEF DESCRIPTION OF THE DRAWINGS

FIG. 9 is a cross-sectional view of the tape bending device of FIG. 5 at a first end of the tape bending device;

FIG. 10 is a cross-sectional view of the tape bending device of FIG. 5 at a second end of the tape bending device;

DETAILED DESCRIPTION

Figure 1:
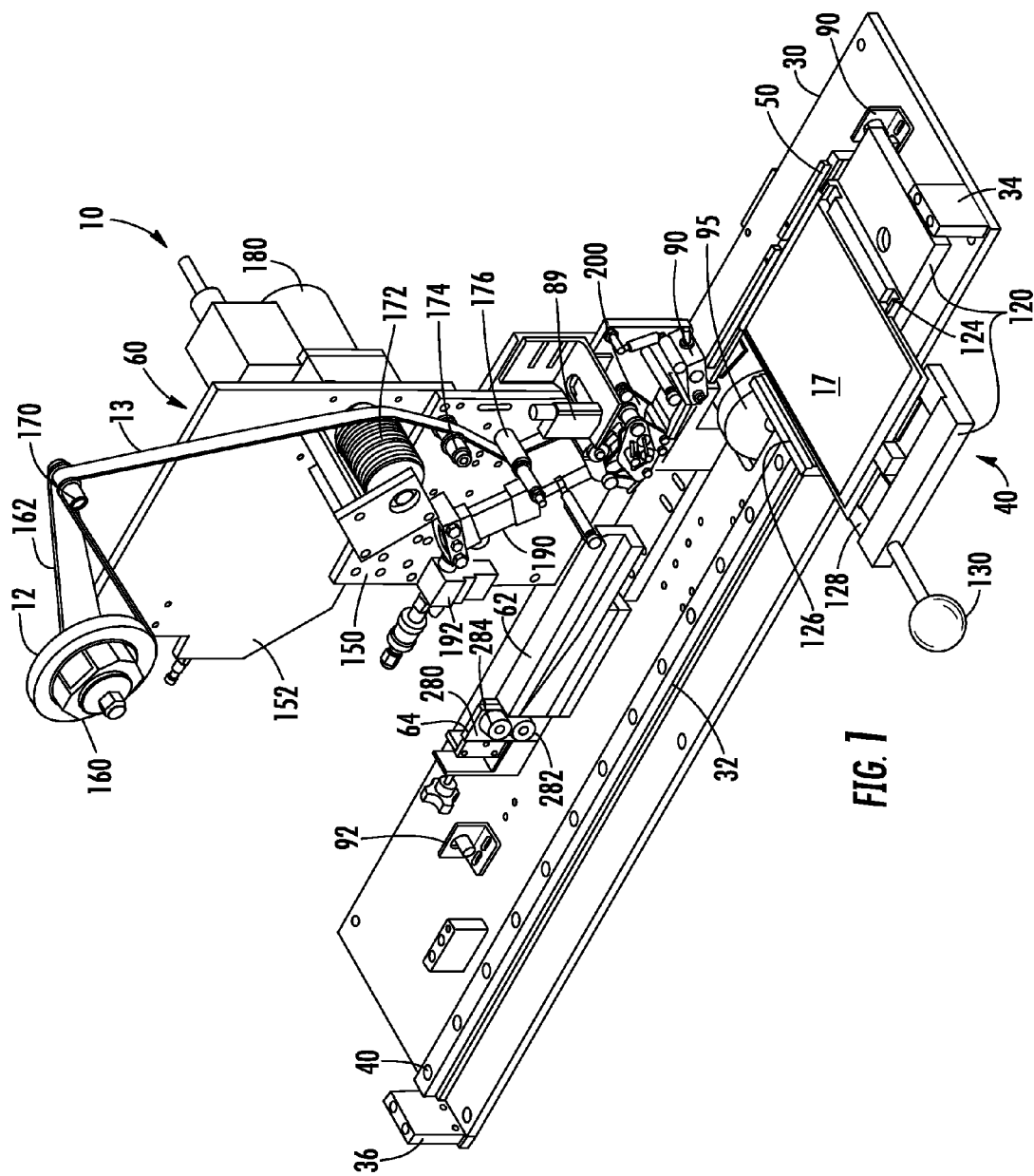
FIG. 1 is a schematic of a tape application machine in accordance with an exemplary embodiment.
Figure 2:
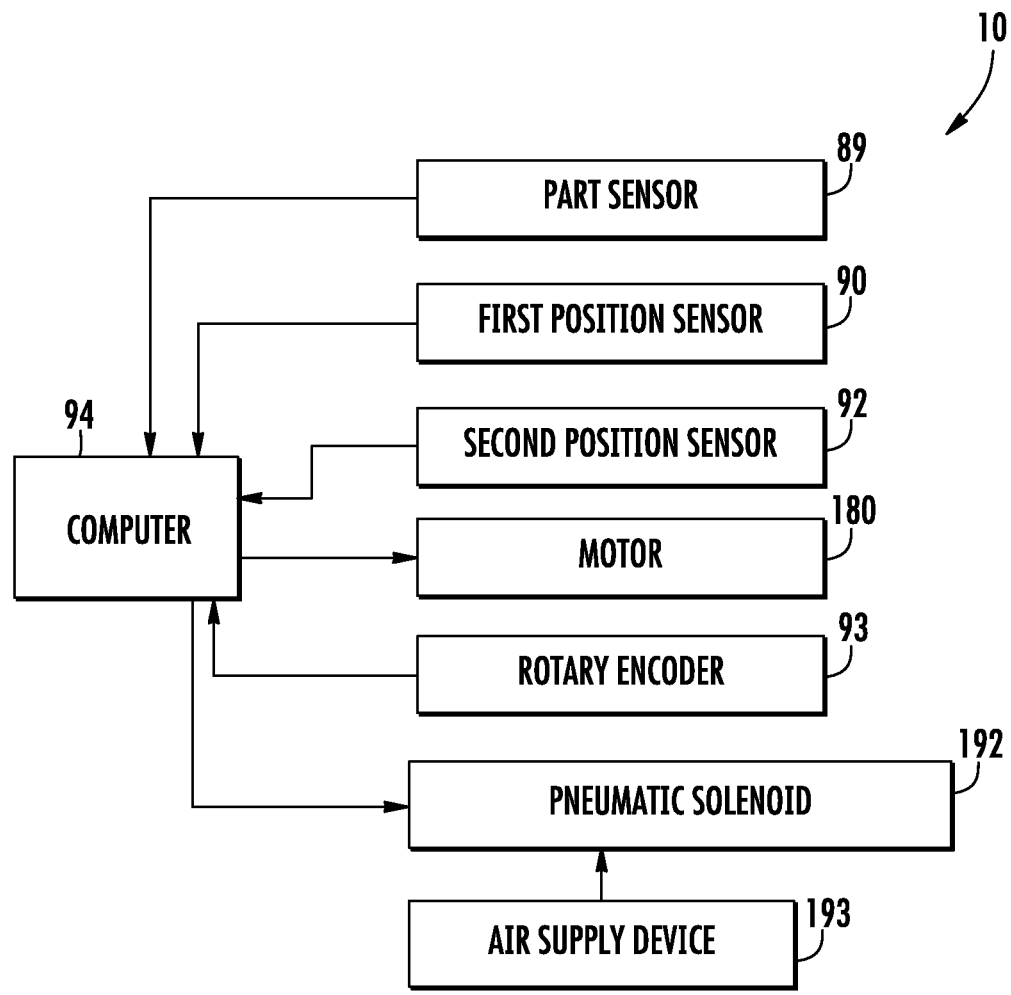
FIG. 2 is a block diagram of a portion of the tape application machine of FIG. 1.
Figure 3:
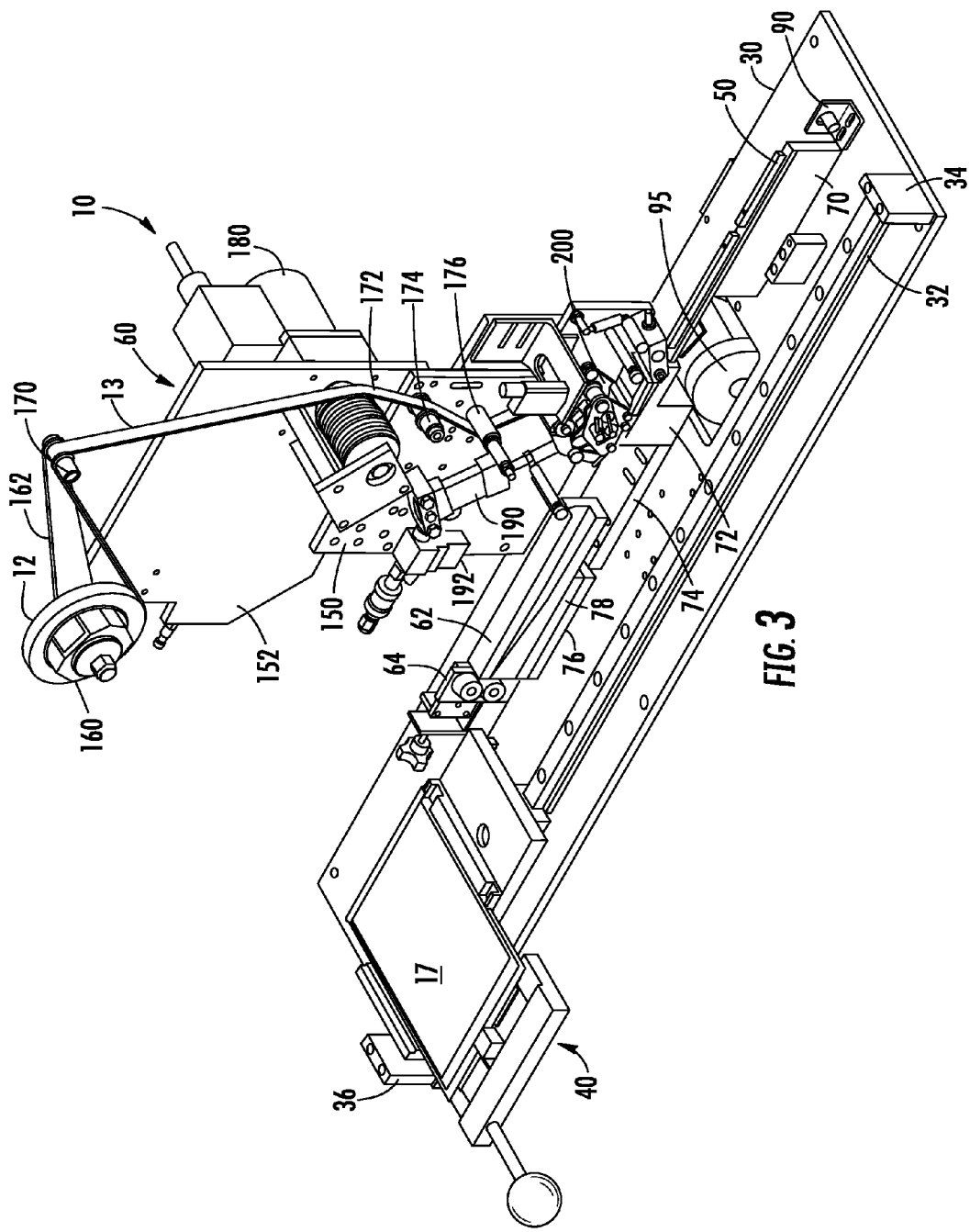
FIG. 3 is another schematic of the tape application machine of FIG. 1.

Referring to FIGS. 1-3, a tape application machine 10 for applying a predetermined length of electrically non-conductive tape on the battery cell 17 in accordance with an exemplary embodiment is provided.

Figure 11:
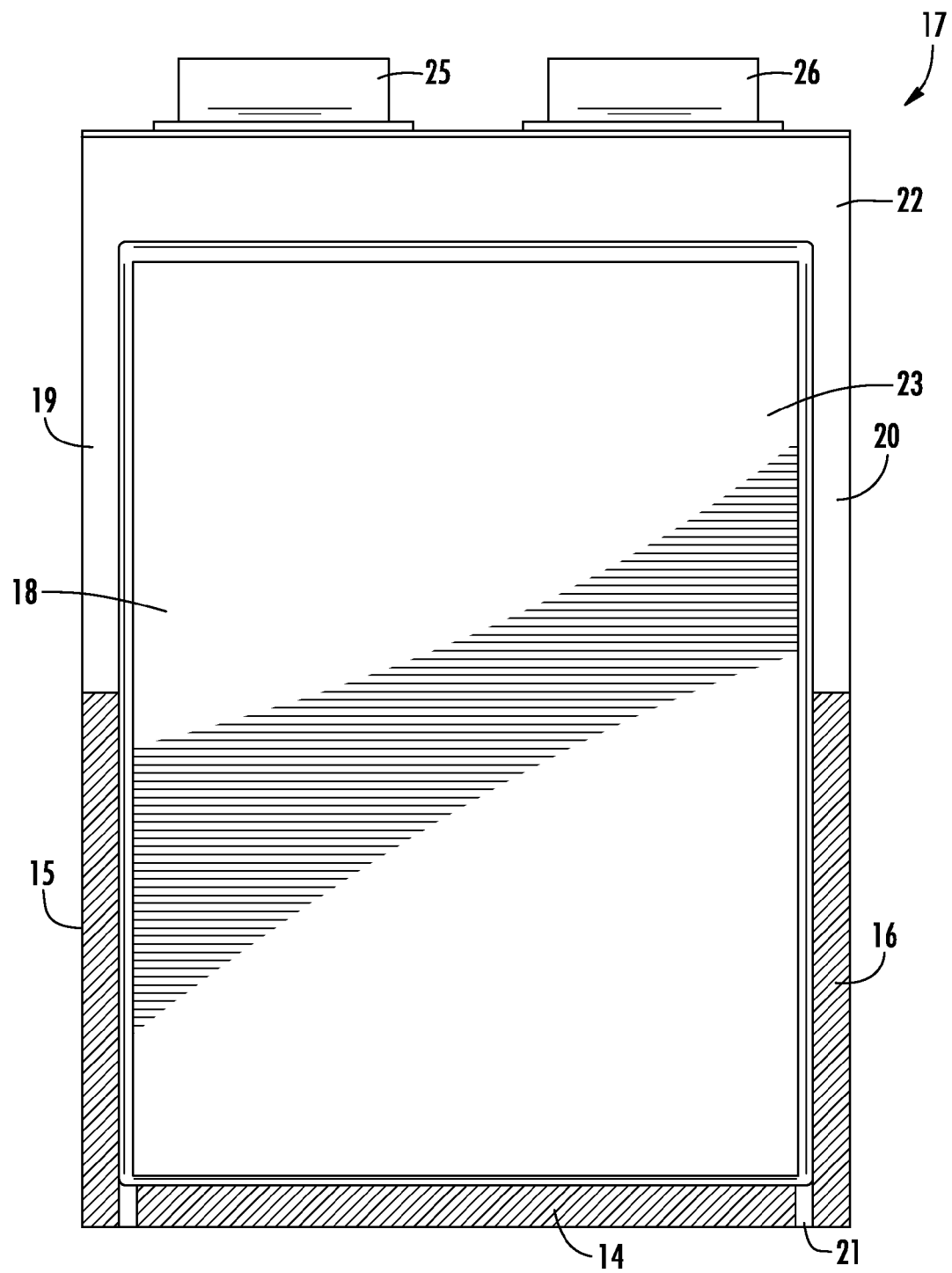
FIG. 11 is a schematic of a first side of a battery cell having electrically non-conductive tape disposed thereon.
Figure 12:
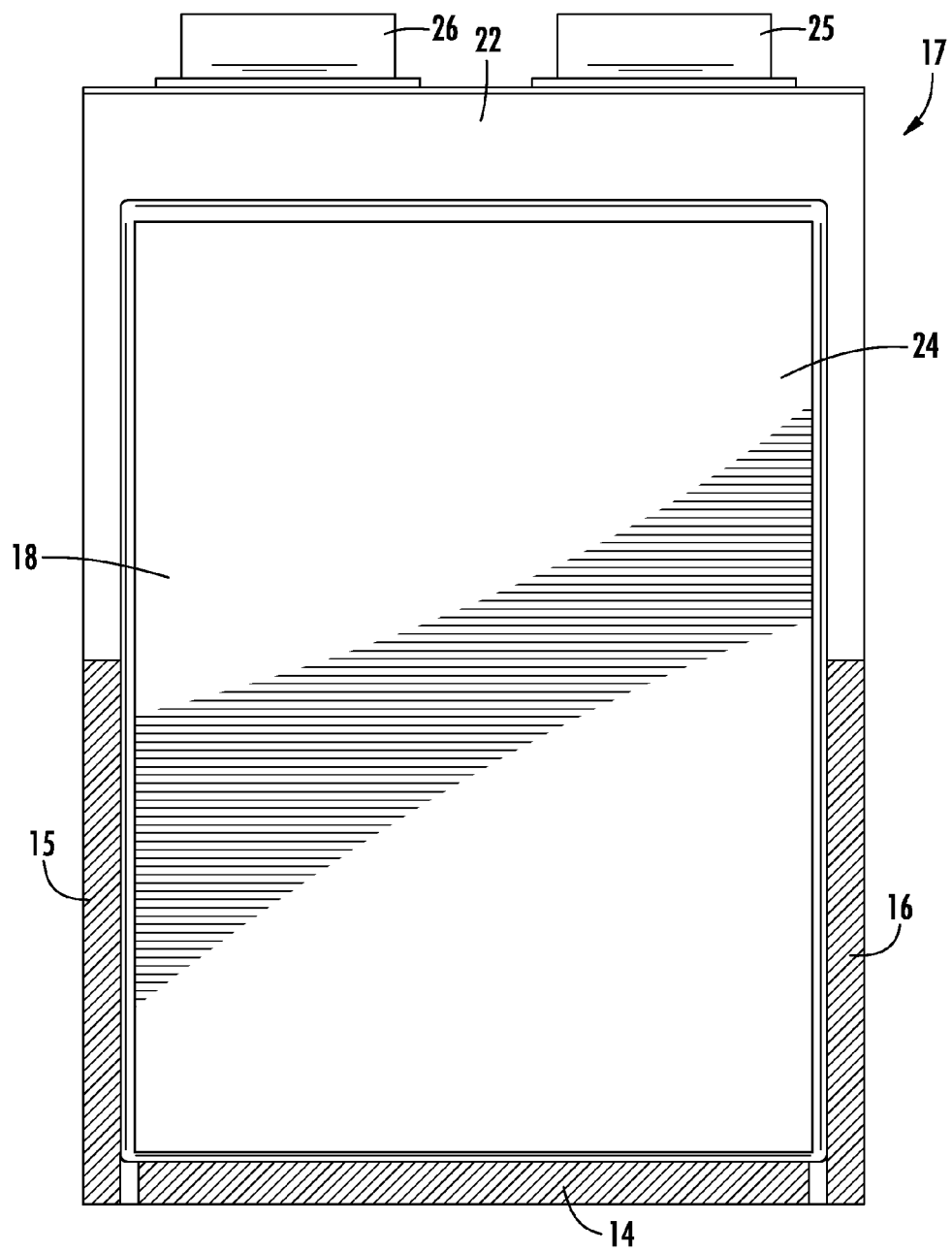
FIG. 12 is a schematic of a second side of the battery cell of FIG. 11 having electrically non-conductive tape disposed thereon.

Referring to FIGS. 11 and 12, an exemplary battery cell 17 has a pouch-type body portion 18, edge portions 19, 20, 21, 22, and electrodes 25, 26. The edge portions 19 and 20 extend outwardly from opposite edges of the pouch-type body portion 18 and are disposed substantially parallel to one another. The edge portions 21, 22 also extend outwardly from opposite edges of the pouch-type body portion 18 and are disposed substantially parallel to one another, and are disposed substantially perpendicular to the edge portions 19, 20. The electrodes 25, 26 extend outwardly from the edge portion 22. In one exemplary embodiment, the battery cell 17 is a lithium-ion pouch type battery cell. Of course, in alternative embodiments, other types of battery cells known to those skilled in the art could be utilized for the battery cell 17. The battery cell 17 has a first side 23 and a second side 24 opposite to the first side 23.

As will be explained in greater detail below, the tape application machine 10 applies electrically non-conductive tape on the edge portions of the battery cell 17. In particular, the tape application machine 10 can apply first and second portions of the predetermined length of electrically non-conductive tape 14 on the first and second sides 23, 24, respectively, on the edge portion 21 of the battery cell 17. Also, the tape application machine 10 can be configured to apply first and second portions of a predetermined length of electrically non-conductive tape 15 on the first and second sides 23, 24, respectively, on the edge portion 19 of the battery cell 17. Further, the tape application machine 10 can be configured to apply first and second portions of a predetermined length of electrically non-conductive tape 16 on the first and second sides 23, 24, respectively, on the edge portion 20 of the battery cell 17.

The tape application machine 10 includes a base plate 30, a linear rail 32, stopping members 34, 36, a nest device 40, a guide member 50, a tape application device 60, a tape bending device 62, a tape compression device 64, and plates 70, 72, 76, 78, a part sensor 89, a first position sensor 90, a second position sensor 92, a rotary encoder 93, a rotatable wheel 95, and a computer 94.

The base plate 30 is provided to support several of the components of the tape application machine 10. In one exemplary embodiment, the base plate 30 is constructed of steel. Of course, in alternative embodiments, the base plate 30 could be constructed of other materials known to those skilled in the art such as plastic for example.

The linear rail 32 is disposed on a first side of the base plate 30 and is coupled to the base plate 30 utilizing bolts (not shown). In one exemplary embodiment, the linear rail 32 is constructed of steel. Of course in alternative embodiments, the linear rail 32 could be constructed of other materials known to those skilled in the art.

The stopping members 34, 36 are disposed on opposite ends of the base plate 30 and are coupled to the base plate 30 utilizing bolts (not shown). The stopping members 34, 36 are utilized to limit the range of linear motion of the nest device 40 on the linear rail 32.

The nest device 40 is configured to hold the battery cell 17 therein. The nest device 40 is further configured to move along the linear rail 40 from a first position, proximate to the stopping member 34, to a second position that is proximate to the stopping member 36. The nest device 40 includes a plate 120, guide members 124, 126, 128, and a handle 130. In one exemplary embodiment, the plate 120 and the guide members 124, 126, 128 are constructed of steel. Of course, in alternative embodiments, the plates and guide members could be constructed of other materials known to those skilled in the art such as plastic for example. The plate 120 is configured to be slidably coupled to the linear rail 32 and a portion of the plate 120 extends outwardly from the base plate 30. The handle 130 is coupled to the plate 120 to allow an operator to move the nest device 40 along the linear rail 32 from the first position to the second position. The guide members 124, 126 are coupled to the plate 120 and extend substantially parallel to one another. The guide member 128 is also coupled to the plate 120. The guide members 124, 126, 128 define a region for receiving the battery cell 17 therebetween and for holding the battery cell 17 therebetween.

Referring to FIGS. 1 and 11, the guide member 50 is configured to contact the edge portion 21 of the battery cell 17 when the nest device 40 is moved from the first position toward the tape application device 60. The guide member 50 is coupled to plates 70, 72 that are further coupled to the base plate 30.

Referring to FIGS. 1-4, the tape application device 62 is configured to dispense predetermined lengths of electrically non-conductive tape on edge portions of the battery cell 17. For purposes of simplicity, the application of first and second portions of a predetermined length of electrically non-conductive tape 14 on the first and second sides 23, 24, respectively, on the edge portion 21 of the battery cell 17 will be explained below. The tape application device 62 includes plates 150, 152, a tape roll holder 160, a tension bar 162, rollers 170, 172, 174, 176, 178, a motor 180, a pneumatic cylinder 190, a solenoid 192, an air supply device 193 (shown in FIG. 2), and a tape dispensing and cutting assembly 200.

The plate 150 is substantially rectangular shaped and is coupled to the base plate 30 and extends substantially perpendicular to a top surface of the base plate 30. In one exemplary embodiment, the plate 150 is constructed of steel. The plate 152 is coupled to a side of the plate 150 and extends substantially parallel to the plate 150 upwardly from the plate 150.

The tape roll holder 160 is rotatably coupled to the plate 152 and is configured to hold a tape roll 12 thereon. The tape roll 12 is ring-shaped and has electrically non-conductive tape 13 with adhesive backing on one side of the tape. In one exemplary embodiment, the electrically non-conductive tape 13 is 0.002" thick and 0.5" wide. Of course, in alternative embodiments, the tape 13 could have other desired thicknesses and widths based on the desired application.

The tension bar 162 is coupled to the tape roll holder 160 is configured to adjust the tension of the tape 13 that extends outwardly from the tape roll 12. The tension bar 162 has a roller 170 rotatably coupled thereto for receiving a portion of the tape 13 thereon.

Figure 4:
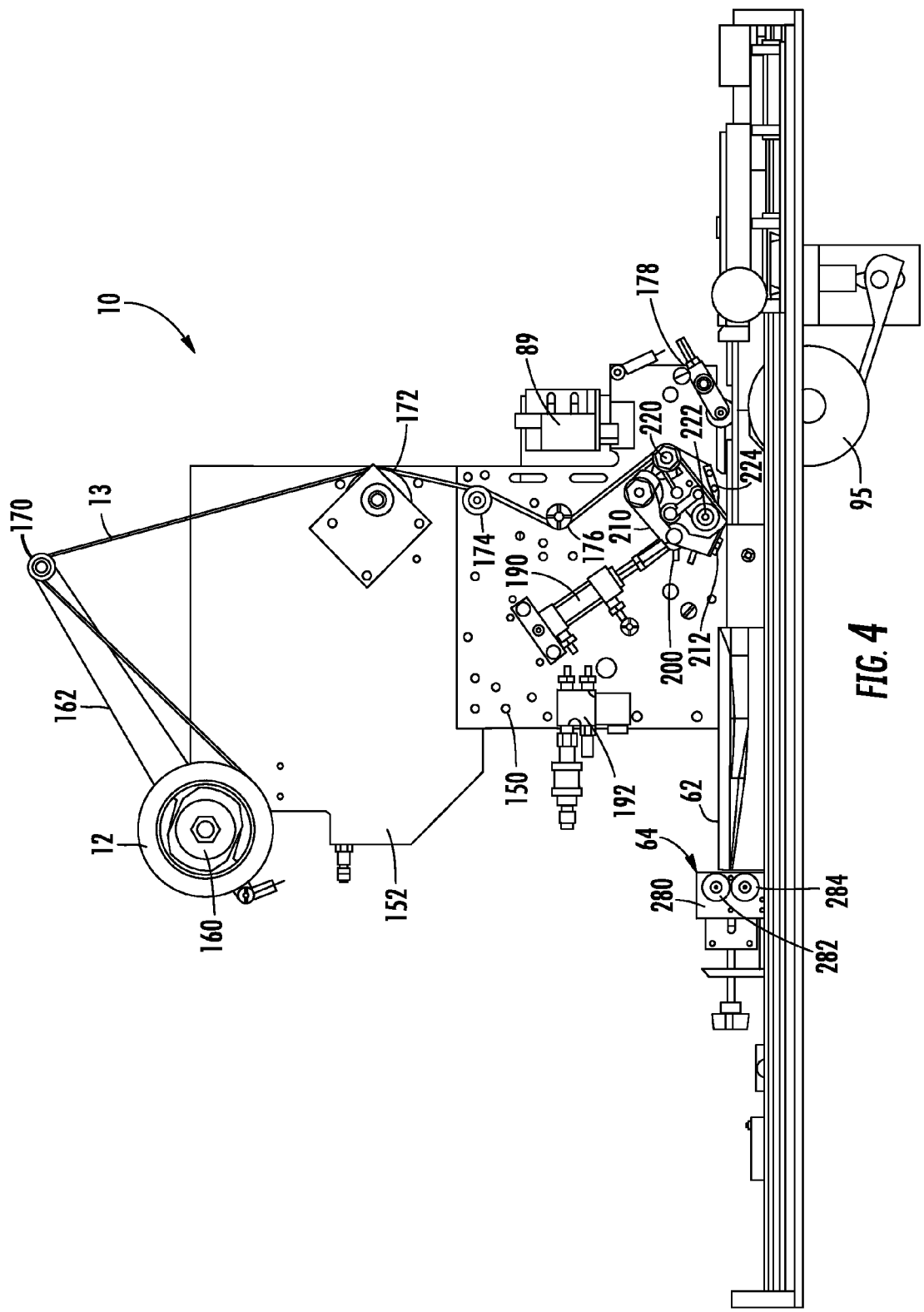
FIG. 4 is a side view of the tape application machine of FIG. 1.
Figure 5:
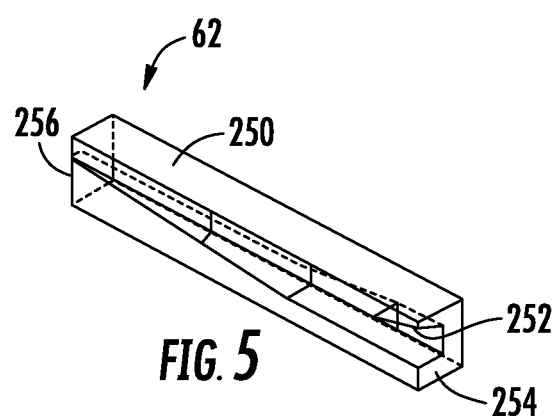
FIGS. 5-8 are views of a tape bending device utilized in the tape application machine of FIG. 1.
Figure 7:
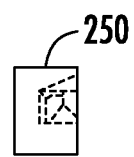
Figure 6:
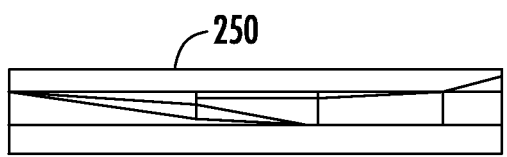
Figure 8:
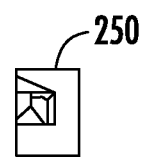

The roller 172 is a gripping roller and is rotatably coupled to the plate 152 and further operably coupled to the motor 180. The motor 180 is configured to rotate the roller 172 in response to a control signal from the computer 94 for dispensing at predetermined length of the electrically non-conductive tape 13. The roller 176 is rotatably coupled to the plate 150. The roller 170 receives a portion of the tape 13 from the roller 174. Referring to FIG. 4, the roller 178 is rotatably coupled to the plate 150 and is configured to position an edge portion of the battery cell 17 for receiving the electrically conductive tape thereon.

The pneumatic cylinder 190 is coupled to the plate 150 and is configured to actuate the tape dispensing and cutting assembly 20 for cutting a predetermined length of electrically non-conductive tape in response to receiving air pressure from the solenoid 192. The solenoid 192 is also coupled to the plate 150 and is configured to supply air pressure from an air supply device 193 to the pneumatic cylinder 190 in response to receiving a control signal from the computer 94.

The tape dispensing and cutting assembly 200 is configured to apply the electrically non-conductive tape to the edge portion 21 of the battery cell 17 on a first side 23 of the battery cell 17 when the nest device 40 moves the battery cell 17 proximate to the assembly 200. The assembly 200 is further configured to cut a predetermined length of the electrically non-conductive tape. The assembly 200 includes a movable body 210, a tape cutter 212, rollers 220, 222, and a guide member 224. The movable body is operably coupled to the plate 150. The tape cutter 212 is operably coupled to the cylinder 190 such that when a shaft of the cylinder 190 extends outwardly the tape cutter 212 cuts the electrically non-conductive tape that is proximate to the cutter 212. The rollers 220, 222 are rotatably coupled to the body 210 and are configured to route the tape 13 from the roller 176 to the guide member 224. The guide member 224 is rotatably coupled to the plate 150.

Referring to FIGS. 1 and 5-10, the tape bending device 62 is disposed on a pair of stacked plates 76, 78 which are further coupled to the base plate 30 proximate to the linear rail 32. The tape bending device 62 is configured to receive the edge portion 21 of the battery cell 17 when the nest device 40 moves the battery cell 17 proximate to the tape bending device 62. Prior to entering the tape bending device 62, the battery cell 17 has a first portion of the predetermined length of electrically non-conductive tape 14 disposed on the first side 23 on the edge portion 21, and a second portion of the tape 14 is extending outwardly from the edge portion 21. The tape bending device 62 is configured to conform a second portion of the predetermined length of electrically non-conductive tape 14 onto the second side 24 on the edge portion 21. The tape bending device 62 has a body 250 having a generally rectangular cross-sectional area and a first end 254 and a second end 256. The body 250 has a longitudinally extending slot 252 that extends into a side of the body 250 and extends from the first end 254 to the second end 256. The slot 252 is configured to receive the edge portion 21 of the battery cell 17 therein having the first portion of the electrically non-conductive tape 14 disposed thereon. Referring to FIGS. 9 and 10, the slot 252 has a first size at the first end 254 of the body 250 and a second size at the second end 256 of the body 250 which is smaller than the first size such that the body 250 conforms the second portion of the electrically non-conductive tape 14 onto the second side 24 of the battery cell 17 when the edge portion 21 moves from the first end 254 to the second end 256.

Referring to FIGS. 1, 3 and 4, the tape compression device 64 is configured to compress the electrically non-conductive tape 14 on the first and second sides 23, 24 when the nest device 40 moves proximate to the tape compression device 64. The tape compression device 64 includes a plate 280 and rollers 282, 284 rotatably coupled to the plate 280. The plate 280 is coupled to the base plate 30 proximate to the linear rail 32. The rollers 282, 284 are disposed a predetermined distance apart from another such that the rollers 282, 284 contact the electrically non-conductive tape 14 to compress the electrically non-conductive tape 14 on the first and second sides 23, 24, respectively, of the battery cell 17.

Referring to FIGS. 1 and 2, the part sensor 89 is configured to generate a signal indicating that the nest device 40 is disposed proximate to the tape application device 60, which is received by the computer 94. The part sensor 89 is disposed on the plate 150.

The first position sensor 90 is configured to generate a signal indicating that the nest device 40 is disposed at the first position proximate to the stopping member 34, which is received by the computer 94. The first position sensor 90 is disposed on the base plate 30 proximate to the stopping member 34.

The second position sensor 92 is configured to generate a signal indicating that the nest device 40 is disposed at the second position proximate to the stopping member 36, which is received by the computer 94. The second position sensor 92 is disposed on the base plate 30 proximate to the stopping member 36.

The rotatable wheel 95 is configured to contact a bottom surface of the nest device 40 and to rotate as the nest device 40 moves past the rotatable wheel. The rotary encoder 93 is operably coupled to the rotatable wheel 95 and is configured to generate a linear position signal indicative of a linear position of the nest device 40, and further indicative of a dispensed length of the electrically non-conductive tape 13.

The computer 94 is operably coupled to the part sensor 89, the first position sensor 90, the second position sensor 92, the rotary encoder 93, the motor 180, and the pneumatic solenoid 192. The computer 94 is configured to generate control signals for controlling operation of the motor 180, and the pneumatic solenoid 192 as will be explained in greater detail below.

Figure 13:
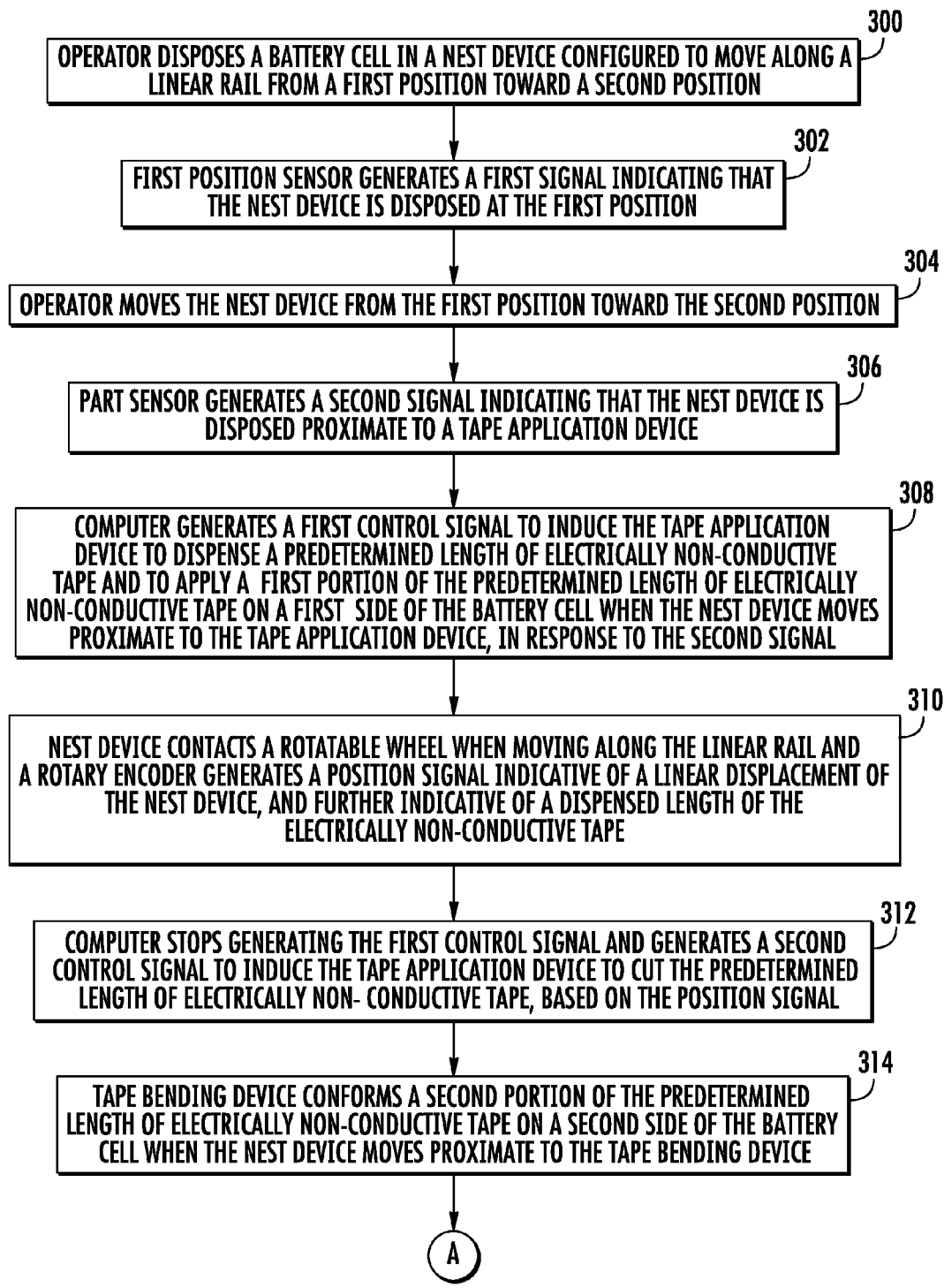
FIGS. 13 and 14 are flowcharts of a method for applying an electrically non-conductive tape to a battery cell in accordance with another exemplary embodiment.
Figure 14:
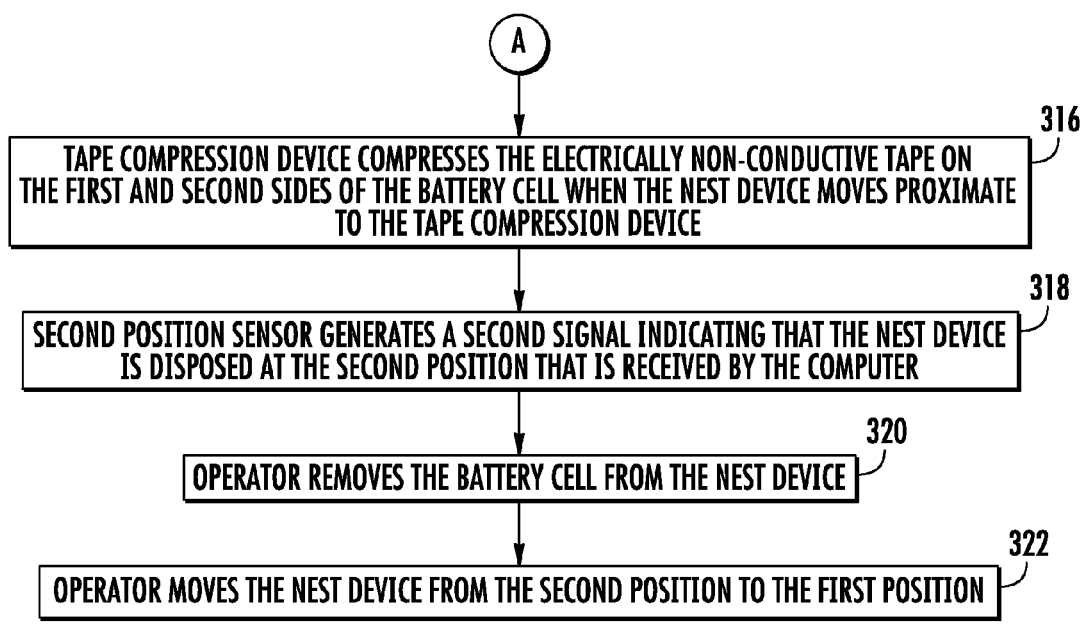

Referring to FIGS. 13 and 14, a method for applying an electrically non-conductive tape to the battery cell 17 in accordance with another exemplary embodiment will now be explained.

At step 300, an operator disposes the battery cell 17 in the nest device 40 configured to move along the linear rail 32 from a first position toward a second position.

At step 302, the first position sensor 90 generates a first signal indicating that the nest device 40 is disposed at the first position.

At step 304, the operator moves the nest device 40 from the first position toward the second position.

At step 306, the part sensor 89 generates a second signal indicating that the nest device 40 is disposed proximate to the tape application device 60.

At step 308, the computer 94 generates a first control signal to induce the tape application device 60 to dispense a predetermined length of electrically non-conductive tape 14 and to apply a first portion of the predetermined length of electrically non-conductive tape 14 on the first side 23 of the battery cell 17 when the nest device 40 moves proximate to the tape application device 60, in response to the second signal.

At step 310, a bottom surface of the nest device 40 contacts the rotatable wheel 95 when the nest device 40 moves along the linear rail 32 and the rotary encoder 93 generates a position signal indicative of a linear displacement of the nest device 40, and further indicative of a dispensed length of the electrically non-conductive tape 13.

At step 312, the computer 94 stops generating the first control signal and generates a second control signal to induce the tape application device 60 to cut a predetermined length of electrically non-conductive tape 14, based on the position signal from the rotary encoder 93.

At step 314, the tape bending device 62 conforms a second portion of the predetermined length of electrically non-conductive tape 14 onto the second side of the battery cell 17 when the nest device 40 moves proximate to the tape bending device 62.

At step 316, the tape compression device 64 compresses the electrically non-conductive tape 14 on the first and second sides 23, 24 of the battery cell 17 when the nest device 40 moves proximate to the tape compression device 64.

At step 318, the second position sensor 92 generates a second signal indicating that the nest device 40 is disposed at the second position that is received by the computer 94.

At step 320, the operator removes the battery cell 17 from the nest device 40.

At step 322, the operator moves the nest device 40 from the second position to the first position.

The tape application machine and the method of applying an electrically non-conductive tape to a battery cell provide a substantial advantage over other machines and methods. In particular, the tape application machine and method provide a technical effect of utilizing a tape bending device to conform tape onto a second side of the battery cell and a tape compression device to compress the tape on first and second sides of the battery cell.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

We claim:

1. A tape application machine, comprising:
    a nest device configured to move from a first position toward a second position, the nest device further configured to hold a battery cell therein;
    a tape application device configured to dispense a predetermined length of electrically non-conductive tape and to apply a first portion of the electrically non-conductive tape on a first side of the battery cell when the nest device moves proximate to the tape application device;
    a tape bending device having a body with a slot extending into a side of the body from a first end of the body to a second end of the body, the slot configured to receive an edge portion of the battery cell therein having the first portion of the electrically non-conductive tape disposed thereon, the body configured to conform a second portion of the electrically non-conductive tape onto a second side of the battery cell when the nest device moves proximate to the tape bending device and the edge portion moves within the slot from the first end to the second end of the body.

2. The tape application machine of claim 1, wherein the slot has a first size at the first end of the body and a second size at the second end of the body which is smaller than the first size.

3. The tape application machine of claim 2, wherein the body of the tape bending device has a generally rectangular cross-sectional area.

4. The tape application machine of claim 3, wherein the slot extends longitudinally from the first end to the second end of the body.

5. The tape application machine of claim 1, further comprising a tape compression device configured to compress the electrically non-conductive tape on the first and second sides of the battery cell when the nest device moves proximate to the tape compression device.

6. A tape application machine, comprising:
   a nest device configured to move along a linear rail from a first position toward a second position, the nest device further configured to hold a battery cell therein;
   a tape application device configured to dispense a predetermined length of electrically non-conductive tape and to apply a first portion of the electrically non-conductive tape on a first side of the battery cell when the nest device moves proximate to the tape application device;
   a tape bending device configured to conform a second portion of the electrically non-conductive tape onto a second side of the battery cell when the nest device moves proximate to the tape bending device, the tape bending device includes a body having a slot extending into a side of the body, the slot configured to receive an edge portion of the battery cell therein having the first portion of the electrically non-conductive tape disposed thereon, the slot having a first size at a first end of the body and a second size at a second end of the body which is smaller than the first size such that the body conforms the second portion of the electrically non-conductive tape onto the second side of the battery cell when the edge portion moves from the first end to the second end; and
   a tape compression device configured to compress the electrically non-conductive tape on the first and second sides of the battery cell when the nest device moves proximate to the tape compression device.

7. The tape application machine of claim 6, wherein the tape application device comprises:
   a rotatable tape roll holder configured to hold a tape roll thereon, the tape roll having the electrically non-conductive tape;
   a motor configured to drive a gripping roller that moves portions of the electrically non-conductive tape from the tape roll; and
   a tape dispensing and cutting assembly configured to cut the predetermined length of electrically non-conductive tape and to apply the first portion of the electrically non-conductive tape on the first side of the battery cell.

8. The tape application machine of claim 6, wherein the tape compression device comprises first and second rollers disposed a predetermined distance apart from another such that the first and second rollers contact the electrically non-conductive tape to compress the electrically non-conductive tape on the first and second sides of the battery cell.

9. The tape application machine of claim 6, wherein the body of the tape bending device has a generally rectangular cross-sectional area.

10. The tape application machine of claim 9, wherein the slot extends longitudinally from the first end to the second end of the body.

* * * * *